Patented Aug. 4, 1953

2,647,867

UNITED STATES PATENT OFFICE 2,647,867

PROCESS FOR PRODUCTION OF CHOLESTERYL ESTERS BROMINATED IN POSITION 7

Hermann Schaltegger, Flamatt, Switzerland, assignor to Dr. A. Wander A. G., Bern, Switzerland No Drawing. Application September 8, 1949, Serial No. 114,691. In Switzerland October 6, 1948

1 Claim. (Cl. 204—158)

It has already been described how a 7-bromocholesteryl ester can be obtained for instance by treating cholesteryl benzoate with 2,4,6-trichloro-6-bromo-cyclohexadiene (1,4)-one(3) in the presence of ultraviolet light (Swiss Patent No. 273,397). On the other hand it is known that the use of free bromine as has hitherto been customary for making an addition of bromine, leads solely to a double binding in 5,6 position and thus yields a dibromocholesteryl ester as described, for example, by Wallis and Fernholz J. A. C. S. 57, 1504 (1935). It was moreover described how a 7-α-chlorocholesteryl benzoate that melts at 168° can be obtained for instance by treating cholesterol benzoate with tertiary butyl hypochlorite under the influence of ultraviolet light, while without irradiation the result is merely an addition of the hypochlorite to the double bond (U. S. patent application, Serial No. 114,692, Swiss Patent No. 273,398).

The study of the reactions referred to above (substitution of hydrogen by means of a labile bromine or chlorine compound on the one hand and addition of free bromine or hypochlorite to the double bond on the other hand) revealed that hydrogen will also be substituted by bromine if the sterol ester solution is treated directly with elementary bromine under intense ultraviolet irradiation. Titration of the escaping hydrobromic acid gas shows that substitution is almost complete. It is important to point out that in the case of halogenation of aliphatic or cyclic monoenes ultraviolet light has a marked determinative effect on the reaction. This is demonstrated by the fact that instead of an addition to the double binding, substitution in allyl position takes place.

The new process can be expressed by the following formula, in comparison with the method hitherto employed:

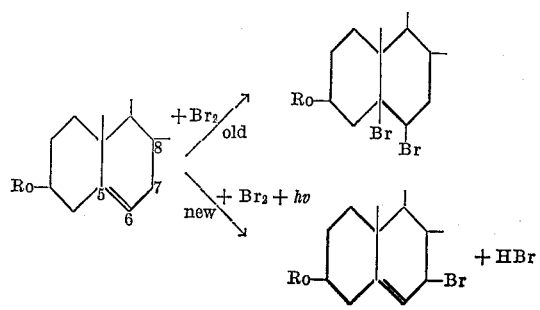

wherein:

$h$=Planck's quantum
$v$=frequency of the ultraviolet light
$R$=optional acyl group, e. g. $C_6H_5CO$.

Example.—10 gm. (approx. 2/100 moles) of cholesteryl benzoate are dissolved in 30 cc. of carbon tetrachloride and subjected to intense ultraviolet irradiation. After heating to boiling point, 3.2 gm. (4/100 moles) of bromine in 15 cc. of an inert solvent, that is carbon tetrachloride are added dropwise. During this dropwise addition and the irradiation, a large quantity of hydrobromic acid gas develops. The reaction is terminated within 7–10 minutes. Following removal of the solvent, the yellow, resin-like residue is dissolved in 20 cc. of acetone. Crystallisation commences in a short while and 7-α-bromocholesteryl benzoate is finally obtained, having a M. P. of 135–136°. After recrystallisation, the substance melts at 143–144°.

What I claim is:

A process for the production of cholesteryl esters brominated in position 7, which comprises dissolving a cholesteryl ester in an inert solvent, reacting said ester with elementary bromine under ultraviolet irradiation, and separating 7 bromo compound thus obtained from said solvent.

HERMANN SCHALTEGGER.

References Cited in the file of this patent

UNITED STATES PATENTS

| Number | Name | Date |
|---|---|---|
| 2,227,839 | Marker | Jan. 7, 1941 |
| 2,228,491 | Werder | Jan. 14, 1941 |
| 2,237,763 | Marker | Apr. 8, 1941 |
| 2,260,085 | Milas et al. | Oct. 21, 1941 |
| 2,439,203 | Ellingboe | Apr. 6, 1948 |
| 2,441,091 | Vliet et al. | May 4, 1948 |
| 2,443,494 | Cass | June 15, 1948 |
| 2,498,390 | Bernstein et al. | Feb. 21, 1950 |

FOREIGN PATENTS

| Number | Country | Date |
|---|---|---|
| 544,051 | Great Britain | Mar. 25, 1942 |
| 574,432 | Great Britain | Jan. 4, 1946 |

OTHER REFERENCES

"Industrial and Engineering Chemistry," vol. 31 (1939), pages 1413 thru 1419, and page 1530.
"Nature," vol. 158 (1946), page 169.
"Annalen der Chemie," vol. 551 (1942), pages 80–119.
"Hackh's Chemical Dictionary," 3rd edition (1944), pages 807, 808.